United States Patent Office 2,725,503
Patented Nov. 29, 1955

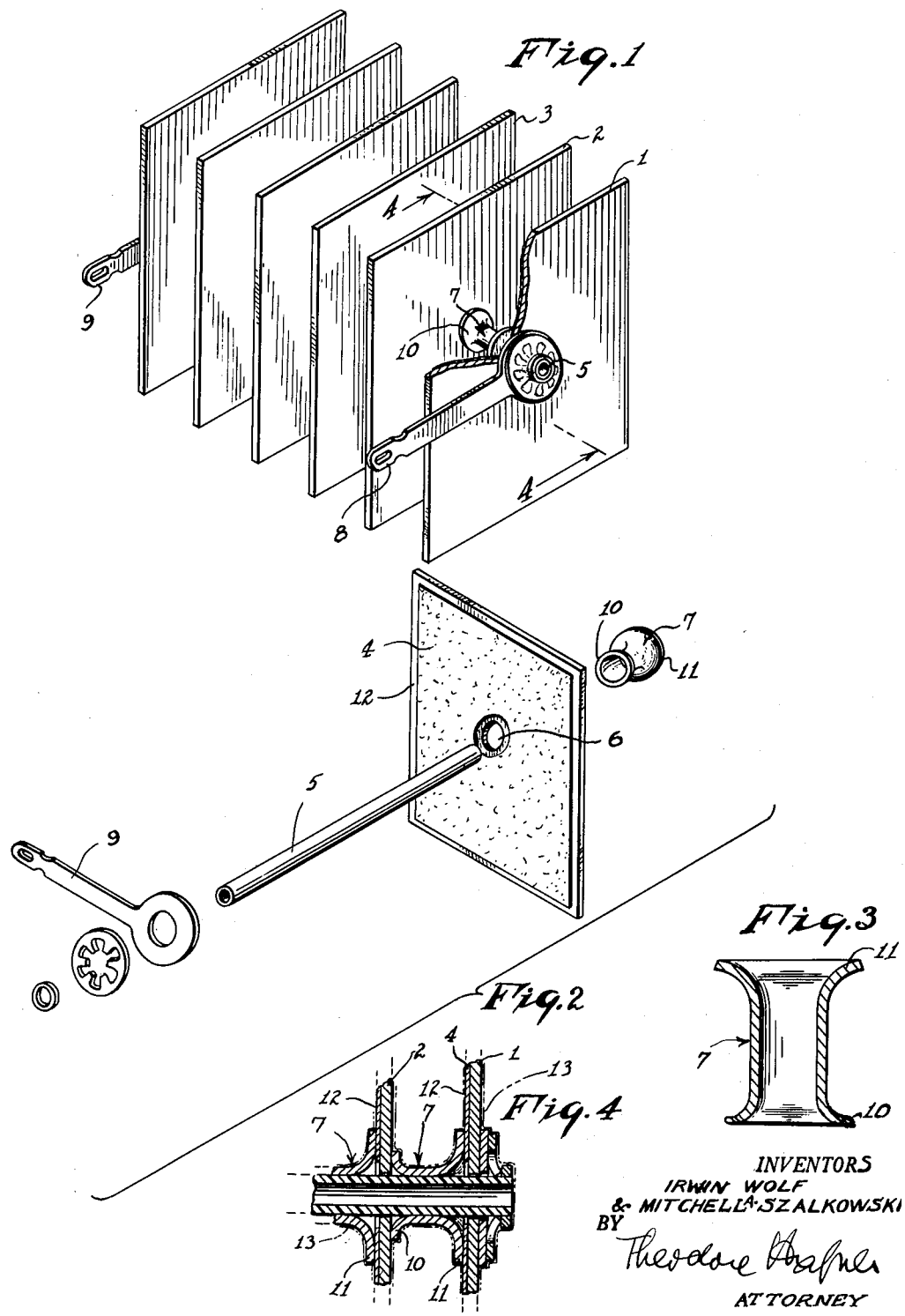

2,725,503

SELENIUM RECTIFIER STACKS

Irwin Wolf, Kew Gardens, and Mitchell A. Szalkowski, Brooklyn, N. Y., assignors to Electronic Devices, Inc., a corporation of New York Application February 12, 1953, Serial No. 336,568

4 Claims. (Cl. 317—234)

This invention relates to stacks of electrical or electronic elements and more specifically to rectifier stacks.

One of the objects of the invention is a stack containing a great number of rectifier elements with the interposition of elastic spacers permitting the use of relatively low stacking pressure to reduce risk of damage to the plate surface in contact with the spacer, while insuring good contact.

Another object of the invention is to provide spacing elements providing sufficient contact surface, yet at the same time taking up a minimum of the space between adjacent stack elements, thus reducing the weight of the assembly and permitting a maximum of air circulation and heat convection at a given load.

Fig. 1 represents schematically and perspectively a rectifier stack embodying certain features of the invention, partly in section.

Fig. 2 shows an exploded view of a rectifier stack.

Fig. 3 shows at an enlarged scale, a spacing element in section.

Fig. 4 represents part of Fig. 1 in section.

In Fig. 1, a number of rectifier plates 1, 2, 3, consist of aluminum, with one side carrying a suitably prepared selenium layer or other semiconducting material provided with a counter electrode alloy schematically indicated at 4, all stacked together over an insulating rod 5, passing through openings 6 of plates 1, 2, 3 with a sleeve-type spacer or bushing 7 interposed therebetween.

The rectifier plates 1, 2, 3 can be connected with each other and with the outside in otherwise well known manner. In Fig. 1 the plates are shown to be interconnected through bushings 7 and also connected with outside terminals schematically indicated at 8, 9 respectively.

In accordance with the invention, spacers 7 consist each of a cylinder of aluminum, brass or similar relatively thin-walled conductive, and preferably elastically flexible material or metal.

Bushings 7 have flanges 10, 11 as indicated in Fig. 3 of unequal diameter, at least one or both of them being bent around a predetermined radius. One flange, preferably the smaller one 10, is held against the aluminum side of plates 1, 2, 3. The other flange 11 and preferably one which has a larger diameter, is pressed against and brought into contact with the counter electrode of side 12 of each of the plates 1, 2, 3, under control of the pressure exerted upon the stack during assembly. In this way any cracks in the coating indicating strain will first appear on the relatively more strained smaller flange pressing against the solid metal, thus permitting strain to be taken off the relatively more sensitive selenium and counter electrode layers pressing against the larger flange.

In order to increase flexibility and reduce to a minimum the risk of damage due to assembly pressure at least one or both flanges 10, 11, but preferably the larger flange 11, are formed slightly curved or conical as exaggeratedly indicated in Fig. 3 at an enlarged scale.

After assembly of the elements of the stack, the entire stack is coated with a substantial heat convecting insulation, schematically indicated at 13. Coating 13 also protects the stack from mechanical damage without decrease in efficiency of operation or heat dissipation.

The particular structure and arrangement of spacers 7 also prevents coating 13 from flowing into and between flanges 10, 11 and the associated contact surfaces of plates 1, 2, 3, consisting of aluminum and counter electrode alloy respectively. This facilitates hermetic sealing of this section.

The radius about which flange 11 is bent, removes the pressure from the periphery of opening 6 where short circuits are most likely to occur. Furthermore, if the counter electrode should melt for example due to excessive pressure, it will be permitted first to flow into the space formed by the radius, instead of flowing into the hole. Thus the risk of shortcircuiting in course of operation is reduced to a minimum.

Bushing 7 does not need to be round and the flanges need not necessarily be full as shown and described. Square or oval bushings or slotted flanges are used for the purpose of this invention with more or less equal effect and in accordance with the specific requirements imposed upon a stack of circuit elements.

It is also not necessary to arrange the spacers as shown in Figs. 1 and 2 in a central position. They can also be arranged eccentrically or in a peripheral position, or if necessary in both central, eccentric or peripheral positions in accordance with the particular type, arrangement in space and circuit connection of the elements involved, all this without exceeding the scope of the invention.

Nor is this disclosure limited to the stacking of rectifier plates. It can also be applied to the stacking of condenser or inductance elements, or the assembly of semiconducting elements, such as germanium crystals, diodes, transistors or any other type or combination of different types of multi-electrode circuit elements which are to be used in the form of multi-element stacks.

We claim:

1. In a stack of rectifier elements arranged in parallelly spaced array and spacers interposed therebetween and consisting of thin-walled sleeves having outwardly extending flanges in direct contact with the adjacent plate surfaces, said flanges having different diameters, the smaller diameter flange being in contact with the metallic surface of the rectifier element and the larger diameter flange being in contact with the rectifying surface of said rectifier element.

2. Stack according to claim 1 wherein at least one of said flanges is conically shaped.

3. Stack according to claim 1 wherein said flanges have different diameters and wherein said elemental plates are rectifier elements, the smaller diameter flange being in contact with the metallic surface of the rectifier element and the larger diameter flange being in contact with the rectifying surface of said rectifier element, at least one of said flanges being conically shaped.

4. Stack according to claim 1 wherein said flanges have different diameters and wherein said elemental plates are rectifier elements, the smaller diameter flange being in contact with the metallic surface of the rectifier element and the larger diameter flange being in contact with the rectifying surface of said rectifier element, at least the larger one of said flanges being conically shaped and bent about a predetermined radius.

References Cited in the file of this patent

UNITED STATES PATENTS

| | | |
|---|---|---|
| 1,801,836 | Aumann | Apr. 21, 1931 |
| 2,114,898 | Dormoy | Apr. 19, 1938 |
| 2,640,871 | Carbary | June 2, 1953 |